Patented Sept. 3, 1940

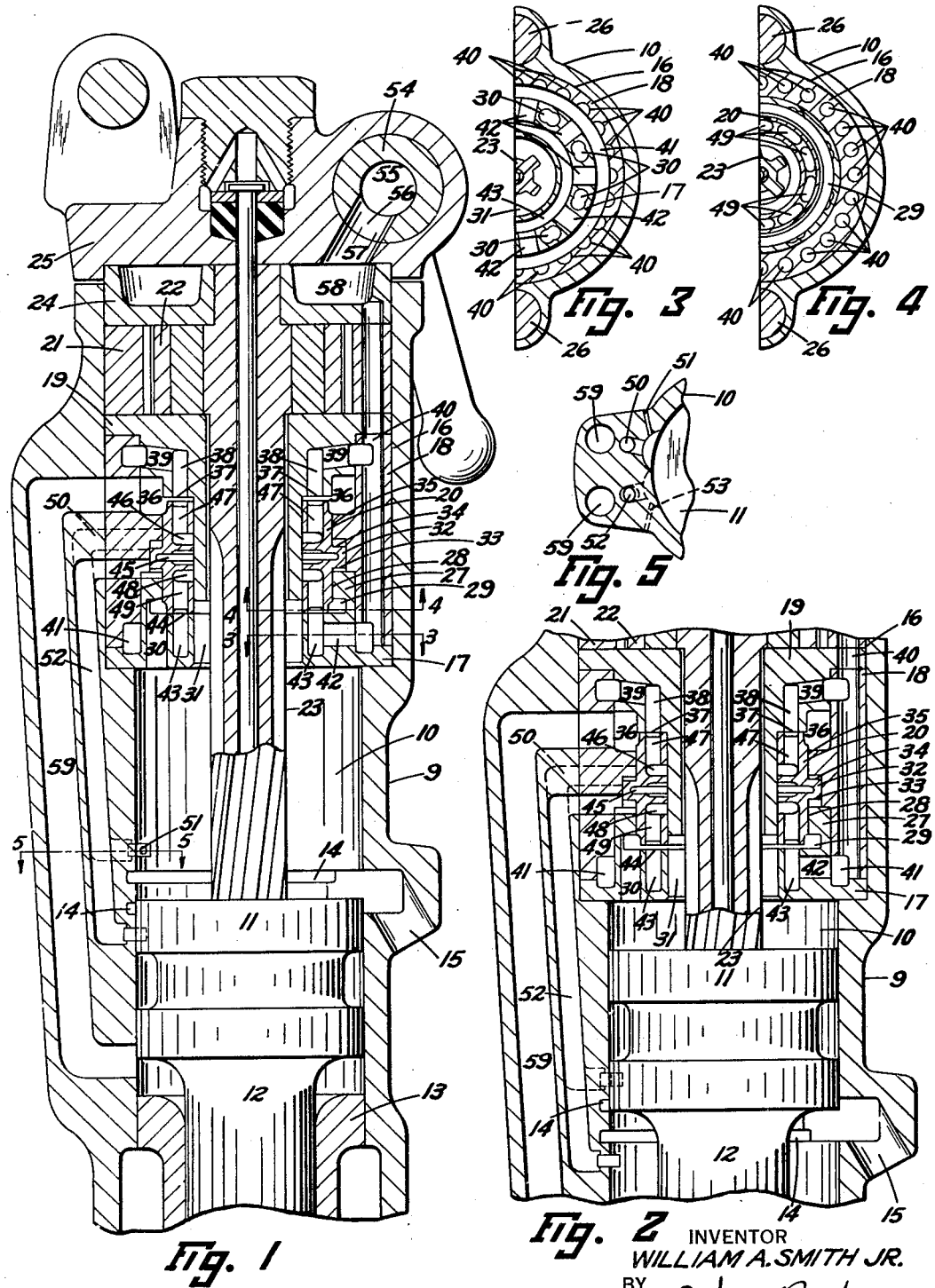

2,213,826

UNITED STATES PATENT OFFICE 2,213,826

VALVE FOR ROCK DRILLS

William A. Smith, Jr., Cleveland, Ohio, assignor to The Cleveland Rock Drill Company, Cleveland, Ohio, a corporation of Ohio Application January 13, 1939, Serial No. 250,777

2 Claims. (Cl. 121—28)

This invention relates broadly to rock drills, but more particularly to a valve construction for fluid actuated rock drills of the percussive type.

One object of this invention is to provide a valve readily responsive to the action of the motive fluid.

Another object of this invention is to produce an improved rock drill valve forming a simple assembly which is strong, durable and efficient.

Other objects of this invention will be apparent from the following detailed description wherein similar characters of reference designate corresponding parts and wherein:

Fig. 1 is an elevational sectional view of a rock drill embodying the invention.

Fig. 2 is a fragmental view similar to Fig. 1 illustrating the valve in another position.

Fig. 3 is a cross sectional view taken in a plane indicated by line 3—3 in Fig. 1.

Fig. 4 is a cross sectional view taken in a plane indicated by line 4—4 in Fig. 1.

Fig. 5 is a cross sectional view taken in a plane indicated by line 5—5 in Fig. 1.

Referring to the drawing, 9 represents a cylinder formed with a piston chamber 10 having a piston 11 reciprocable therein and formed with a stem 12 capable of delivering impacts to a drill steel (not shown), which stem is slidable through a spacer 13 held stationary within the front end of the piston chamber 10. Intermediate its ends, the cylinder 9 is provided with the usual exhaust grooves 14 opening into a common exhaust port 15. The upper end of the cylinder 9 is counterbored as at 16 to accommodate a valve cap 17, a valve casing 18, and a valve bushing 19, which form together a valve housing having a valve 20 slidable therein. Above the valve bushing 19, there is also mounted in the counterbore 16, the ratchet ring 21 of a rotation mechanism which includes the head 22 of a rifle bar 23 extending through the valve casing into the piston 11 for imparting rotation thereto in the usual manner. The ratchet ring 21, valve bushing 19, and the valve casing 18 are held against relative rotation by any suitable means such as dowel pin (not shown), and against lengthwise movement by a bearing plate 24 mounted on the ratchet ring 21 and clamped by a back head 25 which is secured to the cylinder 9 by two side bolts 26.

The valve cap 17 is formed with a sleeved portion 27 extending partway into the casing 18 to form a bearing 28 for the lower end portion of the valve 20, and is provided with an annular groove 29 in constant communication with the rear end of the piston chamber 10 through a plurality of ports 30. Centrally through the valve cap 17, there is a bore 31 substantially larger than the diameter of the rifle bar 23, through which bore motive fluid may also be admitted into the rear end of the chamber 10 as will be explained later.

The valve 20, which is of a sleevelike shape, is provided intermediate its ends with an external annular flange 32 forming on the lower side thereof an actuating area 33 and on the other side an opposed actuating area 34. Above the flange 32, the valve casing 18 is also shaped to form a valve bearing 35 above which is provided an annular groove 36 in constant communication with the front end of the cylinder 10 through one or more passages 59. Internally, the valve 20 bears on the bushing 19 which extends into the valve but falls short of the valve cap 17. Adjacent the annular groove 36, the valve bushing is formed with an annular shoulder 37 forming a valve seat for the upper end of the valve 20, which seat is provided with a plurality of ports 38 opening thereon between the marginal edges thereof and extending therefrom into the bushing 19 in constant communication with radial ports 39 opening into inlet passages 40, which passages extend from the bearing plate 24 into the valve cap 17 through the ratchet ring 21 and valve casing 18. The lower end of the inlet ports 40 open into an annular groove 41 from where motive fluid may flow through radial ports 42 into longitudinally disposed ports 43 formed within the valve cap 17 between the ports 30 and the bore 31. The ports 43 are similar to the ports 38 above described and lead to an annular valve seat 44 with which the lower end of the valve 20 is capable of engagement.

To lighten the valve 20, the same is provided with a central annular groove 45 extending into the annular flange 32. On one side of the groove 45, there is provided another annular groove 46 in communication with the upper end of the valve through a plurality of longitudinally disposed ports 47, which form with the groove 46 a motive fluid storing space, the purpose of which will be explained later. Within the lower end portion of the valve there is provided an annular groove 48 in communication with the lower end of the valve through ports 49.

Opening into the chamber 10, above the exhaust grooves 14, there is a kick port 50 leading to the valve actuating area 34. This port near its opening into the chamber 10 is in communication with the atmosphere through a restricted vent 51. Opening into the chamber 10 below the exhaust groove 14, there is a similar kick port 52 leading to the valve actuating area 33, which port near its opening into the piston chamber is also in communication with the atmosphere through the restricted vent 53.

Rotatable within the head 25, there is a throttle valve 54 formed with a central inlet passage 55 and a radial port 56 capable of communication with a port 57 provided within the head 25 and opening into an enlarged annular groove 58 formed within the bearing plate 24.

In the operation, with the parts positioned as shown in Fig. 1, motive fluid from the throttle valve 54 is admitted into the enlarged annular groove 58 through the inlet passage 55 and the ports 56 and 57. From the groove 58 motive fluid is free to flow into the inlet ports 40 and therefrom into the ports 38 provided within the valve bushing 19 through the radial ports 39. From the ports 40, the motive fluid will also be admitted into the annular groove 41 of the valve cap 17, and therefrom into the ports 43 via the radial ports 42, thereby admitting motive fluid directly on the two valve seats 37 and 44. When the valve 20 is engaging the lower valve seat 44, it is in spaced relation with the upper valve seat 27, thereby enabling a free flow of the fluid from the ports 38 into the annular groove 36, and therefrom into the lower end of the chamber 10 through the passages 59. In this instance, the valve 20 is momentarily held stationary by the action of the fluid on the upper end of the valve adjacent the valve seat 37, which end forms a holding area for the valve. The pressure fluid admitted within the lower end of the chamber 10 through the passages 59 will act on the piston 11 to drive it upwardly. As the piston uncovers the kick port 52, the motive fluid from the chamber 10 will flow to the actuating area 33 of the valve 20 via the kick port 52, and since this area is larger than the holding area adjacent the valve seat 37, the valve will shift into the position shown in Fig. 2, that is, into engagement with the valve seat 37 for preventing supply of the motive fluid into the annular groove 36 and consequently into the lower end of the chamber 10.

By the time the valve 20 has assumed its new position, the piston 11 driven upwardly by the motive fluid admitted into the front end of the chamber 10 will assume a position substantially as shown in Fig. 2, thereby enabling motive fluid from the front end of the piston chamber to exhaust to the atmosphere via the exhaust port 15. The valve 20 now engaging the valve seat 37 is in spaced relation with the valve seat 44, thereby enabling the motive fluid admitted within ports 43 to flow into the annular groove 29 and therefrom into the rear end of the chamber 10 via the ports 30. From the ports 43 motive fluid may also flow into the rear end of the chamber 10 through the enlarged bore 31. In this instance, the valve 20 is momentarily held in open position relative to the ports 30 and the bore 31 by the motive fluid acting on the lower end of the valve, which end forms a holding area similar to the upper end thereof. Due to the action of the motive fluid within the rear end of the chamber 10, the piston 11 will be driven downwardly to deliver its blow to the drill steel. During this downward movement of the piston, the motive fluid previously admitted on the valve actuating area 33 will exhaust to the atmosphere via the kick port 52 and vent 53, thereby enabling the valve 20 to shift into the position shown in Fig. 1 by the motive fluid admitted on the actuating area 34 via the kick port 50 now uncovered by the piston 11. As the piston reaches the end of its forward stroke, it will uncover the exhaust grooves 14 to enable the motive fluid previously admitted into the rear end of the piston chamber to exhaust to the atmosphere via the exhaust port 15.

During the rearward stroke of the piston, the motive fluid previously admitted on the valve actuating area 34 will exhaust to the atmosphere through the kick port 50 and the vent 51, thereby enabling the valve to shift to the position shown in Fig. 2 when the piston again uncovers the kick port 52.

In practice the valve ports 47 and 49 having motive fluid constantly supplied therein by the inlet ports 38 and 43 respectively, actually constitute a reservoir for the motive fluid which has been found helpful to a quick discharge of motive fluid into both ends of the piston chamber, thereby enabling the stroke of the valve to be relatively small, that is, from .015″ to .020″. With reference to the admission of the motive fluid into the rear end of the piston chamber, the combined area of the inlet ports 43 is calculated to enable the supply of a relatively large amount of motive fluid into the rear end of the chamber 10 through the double inlet including the ports 30 and bore 31. As shown in Fig. 2, it will be seen that from the inlet ports 43, the motive fluid may flow inside of the valve seat 44 to be supplied therefrom into the rear end of the chamber via the bore 31, and outside of the valve seat 44 into the chamber 10 via the ports 30, thereby enabling a quick and sufficient supply of motive fluid into the rear end of the piston chamber irrespective of the relatively small space between the lower end of the valve and its component valve seat 44.

Although the foregoing description is necessarily of a detailed character, in order to completely set forth the invention, it is to be understood that the specific terminology is not intended to be restrictive or confining and it is to be further understood that various rearrangements of parts and modifications of structural detail may be resorted to without departing from the scope or spirit of the invention as herein claimed.

I claim:

1. In a fluid actuated rock drill, a cylinder having a piston chamber and a piston reciprocable therein, an exhaust port for the piston chamber, a valve housing having opposed annular valve seats formed therein, a sleeve valve reciprocable within said housing between said seats, supply ports admitting motive fluid into said housing through said valve seats, spaces within said valve acting as constant storing means for motive fluid admitted into said housing through said valve seats, inlet passages leading from said housing to the piston chamber, an external annular flange on said valve having opposed actuating areas intermittently exposed to pressure fluid controlled by the piston for actuating the valve and causing the intermittent engagement of the ends of the valve with said valve seats to control communication of the supply ports and storing spaces with the inlet passages, and opposed holding areas on the ends of said valve exposed to pressure fluid flowing through said supply ports toward the ends of said valve and into said inlet passages for momentarily holding the valve.

2. In a fluid actuated rock drill, a cylinder having a piston chamber and a piston reciprocable therein, an exhaust port for the piston chamber, a valve housing having opposed annular valve seats formed therein, a sleeve valve reciprocable within said housing between said seats, supply ports admitting motive fluid into said housing through said valve seats, front inlet passages leading from said housing to one end portion of said chamber, rear inlet passages leading from said housing to the other end portion of said chamber and opening into said housing inside and outside of one of said annular valve seats, opposed actuating areas on said valve intermittently exposed to pressure fluid for effecting intermittent engagement of the valve with said seats to control communication between the supply ports and the inlet passages, and opposed holding areas on said valve exposed to pressure fluid flowing through said supply ports toward said areas and to said passages for momentarily holding the valve.

WILLIAM A. SMITH, Jr.